United States Patent [19]

Furuya

[11] 3,798,356

[45] Mar. 19, 1974

[54] SATURATION CONTROL CIRCUIT

[75] Inventor: Sachinori Furuya, Ibaragi, Japan

[73] Assignee: Matsushita Electric Industrial Co., Ltd., Osaka, Japan

[22] Filed: July 21, 1972

[21] Appl. No.: 273,715

[30] Foreign Application Priority Data

Sept. 16, 1971 Japan .............................. 46-72816

[52] U.S. Cl. .............................................. 178/5.4 AC

[51] Int. Cl. .............................................. H04n 9/48

[58] Field of Search .............................. 178/5.4 AC

[56] References Cited

UNITED STATES PATENTS 2,798,900 7/1957 Bradley ......................... 178/5.4 AC 2,841,643 7/1958 Loughlin ....................... 178/5.4 AC

*Primary Examiner*—Richard Murray

*Attorney, Agent, or Firm*—Stevens, Davis, Miller & Mosher

[57] ABSTRACT

A saturation control circuit for color television receivers and the like which uses a multi-gate field-effect transistor serving as an amplifying element in a band-pass amplifier circuit, an amplifier section being constituted by a first gate, source and drain of the multi-gate field-effect transistor, and in which a voltage varying in response to an adjustment of brightness or contrast is supplied to a second gate of the multi-gate field-effect transistor, whereby the amplification factor of the afore-said amplifier section is automatically changed in response to the brightness or contrast control for automatic saturation control.

6 Claims, 2 Drawing Figures

PATENTED MAR 19 1974 3,798,356

SHEET 1 OF 2

SATURATION CONTROL CIRCUIT

This invention relates to saturation control in color television receivers and the like and, more particularly, to saturation control means, which can automatically control the color purity or saturation as the brightness or contrast of the picture is changed through the brightness or contrast control to always provide chroma most comfortable to the eye.

In color television receivers and the like, the brightness and contrast are usually variable. Usually, when the brightness or contrast is controlled it is necessary to also adjust the saturation, namely reduce it when the brightness or contrast is reduced and increase it in the converse case, so as to obtain picture chroma comfortable to the eye.

The invention has for its object the provision of means to effect automatic saturation control with changes in the brightness and contrast.

Figure 1:
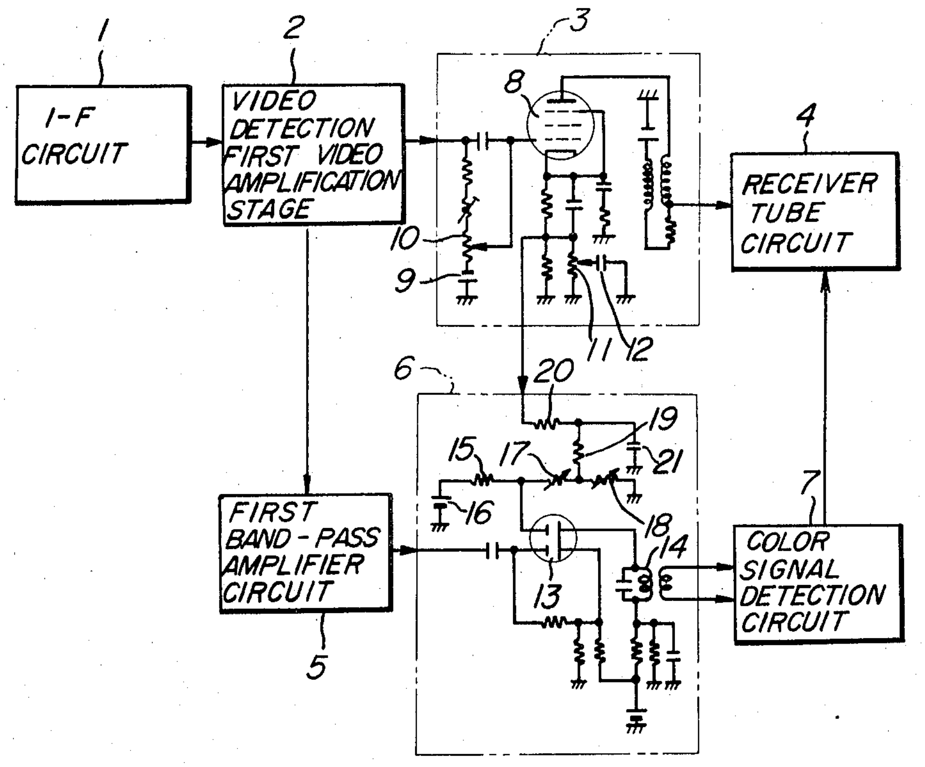
Figure 2:
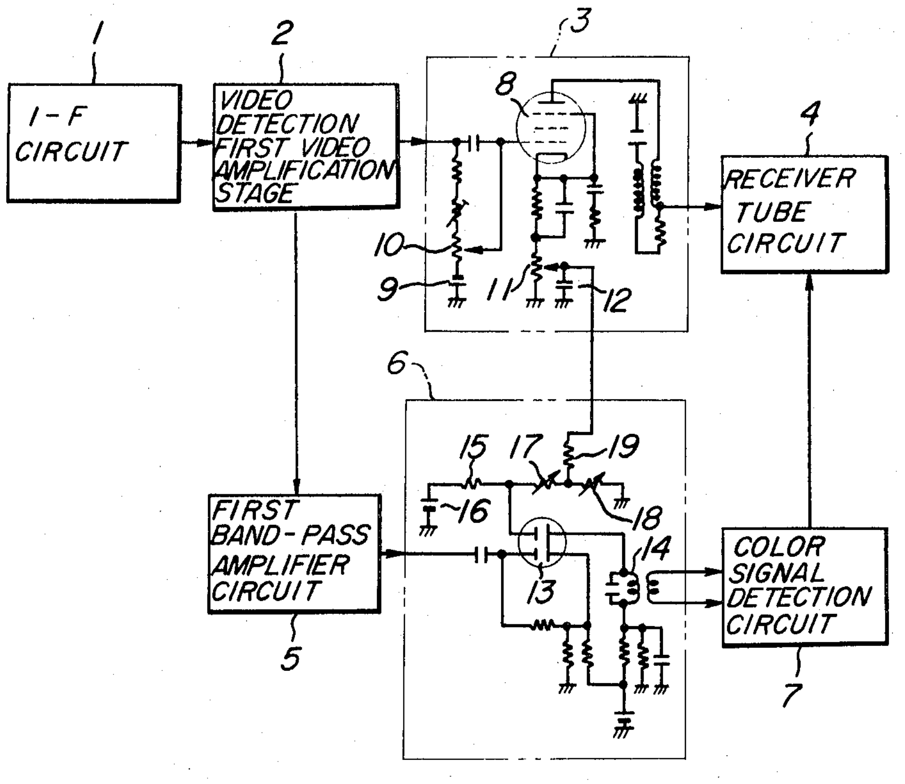

For the invention to be more fully understood, it will now be described in conjunction with examples of its application to color television receivers, reference being had to the accompanying drawings, in which:

FIG. 1 is a circuit diagram, partly in block form, showing part of a color television receiver circuit using a saturation control means embodying the invention; and FIG. 2 is a circuit diagram, similar to FIG. 1 but showing a color television receiver circuit using another embodiment of the saturation control means according to the invention.

Referring now to FIG. 1, which shows one embodiment of the invention, reference numeral 1 designates an *i–f* circuit to obtain an *i–f* signal, numeral 2 designates a video detection, first video amplification stage to obtain a video signal from the *i–f* signal, numeral 3 a second video amplification stage to amplify the video signal, numeral 4 a receiver tube circuit to receive the amplified video signal, numeral 5 a first band-pass amplifier circuit to separate and amplify the color sub-carrier signal, numeral 6 is a second band-pass amplifier circuit to also separate and amplify the color sub-carrier signal and at the same time effect saturation control in accordance with the invention, and numeral 7 a color signal detection circuit to demodulate the color sub-carrier signal for detection of color signals supplied to the receiver tube circuit 4.

The circuits irrelevant to the invention are all omitted.

In the second video amplification stage 3, the grid input circuit for an amplifier tube 8 includes a bias source 9 and a variable resistor 10. Thus, by varying the grid bias voltage the *d–c* level of the video signal may be varied for the brightness control. the cathode circuit for the amplifier tube includes a variable resistor 11 and a capacitor 12, whereby through variation of the *a–c* feedback level the amplitude of the video signal may be varied for the control of contrast. With this construction, adjusting the variable resistor 10 or 11 in the direction of lowering the brightness or contrast has the effect of reducing the cathode current in the amplifier tube 8. As a result, the cathode voltage or voltage on the upper end of the variable resistor is reduced. On the other hand, when the brightness or contrast is increased, the cathode voltage is also increased.

The second band-pass amplifier circuit 6 comprises a dual-gate field-effect transistor 13 (hereinafter referred to as dual-gate FET) serving as an amplifying element. The color sub-carrier signal from the first band-pass amplifier circuit 5 is coupled to a first gate of the dual-gate FET 13. The first gate, source and drain of the FET 13 are biased with suitable *d–c* voltages, and the drain is connected to an output tuning circuit 14 providing the color sub-carrier output signal to the color signal detection circuit 7. The second gate of the FET 13 is biased from a bias source 16 through a resistor 15. Also, variable resistors 17 and 18 are connected in series between the second gate and ground, so that the bias voltage on the second gate may be varied. Further, the junction between the variable resistors 17 and 18 is connected direct-current-wise through resistors 19 and 20 to the upper end, that is, the end nearer the amplifier tube 8, of the variable resistor 11 in the second video amplification stage 3. Thus, through the variable resistors 17 and 18 part of the cathode voltage on the video signal amplifier tube 8 may be adjusted for application to the second gate of the dual-gate FET 13. Numeral 21 designates a capacitor to eliminate *a–c* components (video signal) contained in the cathode voltage. By varying the bias voltage on the second gate of the dual-gate FET 13, the amplification factor of the second band-pass amplifier section constituted by the first gate, source and drain of the dual-gate FET 13 may be varied to vary the amplitude of the color sub-carrier signal for varying the saturation. As to the sizes of the variable resistors 17 and 18, the variable resistor 18 is installed as a saturation controlling element on the panel, and the bias voltage on the second gate of the dual-gate FET 13 is made adjustable through the variable resistor 17 such that when the variable resistor 18 is set to the "off" position, the drain current in the dual-gate FET 13 is substantially reduced to zero, that is, the picture becomes devoid of color. The sizes of the resistors 19 and 20 are determined such that it is possible to control the amplification factor of the dual-gate FET 13 to an optimum value through variation of the cathode voltage on the amplifier tube 8.

With the circuit construction described above, once the variable resistor 18 serving as a saturation controlling element is adjusted to a fixed position corresponding to the desired saturation, subsequent adjustment of the variable resistor 10 or 11 for brightness or contrast control will cause a change in the cathode voltage on the video amplifier tube 8, and this change is transmitted through the resistors 19 and 20 and variable resistors 17 and 18 to the second gate of the dual-gate FET 13. As a result, the amplification factor of the second band-pass amplifier section constituted by the first gate, source and drain of the dual-gate FET 13 is changed; it is increased when the brightness or contrast is increased and it is lowered in the converse case. In the above manner, the saturation can be automatically controlled to always provide optimum picture chroma comfortable to the eye. Thus, the conventional need of re-adjusting the saturation every time the brightness or contrast is adjusted can be eliminated, so that it is possible to realize a color television receiver, in which the picture adjustments are very convenient.

FIG. 2 shows another embodiment of the invention, with which a color television receiver circuit construction simpler than that of FIG. 1 described above is obtained. In FIG. 2, like parts to those shown in FIG. 1 are designated by like reference numerals, and are not described any further. In this embodiment, the cathode voltage on video amplifier tube 8 is obtained directly from the tap terminal of variable resistor 11, and is transmitted through resistor 19 to the junction between variable resistors 17 and 18. By the action of capacitor 12, *d–c* voltage free from *a–c* components is available directly on the connection point between the capacitor 12 and the tap terminal of the variable resistor 11, so that the resistor 20 and capacitor 21 for *a–c* component removal shown in FIG. 1 can be dispensed with. The automatic saturation control is effected in the same way as in the preceding embodiment shown in FIG. 1.

While the preceding embodiments have used the dual-gate FET 13, it is of course possible to use any multi-gate field-effect transistor having two or more gates. The use of such multi-gate field-effect transistors is based on the grounds that the input impedance in such multi-gate field-effect transistors is high, with the intergate impedance between adjacent gates being extremely high, while the coupling capacitance between adjacent gates is extremely small, with the intergate interference being substantially negligible, giving no rise to *a–c* intereference between the video amplifier circuit and band-pass amplifier circuit, and hence no adverse effects upon one another, and that the amplification factor can be controlled very easily.

Also, while the preceding embodiments have used the amplifier tube 8 as the amplifying element in the second video amplifier stage, other amplifying elements such as transistors may be used as well.

As has been described in the foregoing, according to the invention it is possible to provide a saturation control means, which is simple in construction and is able to automatically control the saturation in response to a change in brightness or contrast so as to always provide chroma most comfortable to the eye, and with which there are no mutual adverse effects of the video amplifier circuit and band-pass amplifier circuit upon one another.

What is claimed is:

1. A color television receiver circuit capable of automatic saturation control comprising means to obtain a composite video signal including a video signal and a color sub-carrier signal, a video signal amplifier circuit including a video amplifying element to amplify the video signal for supplying the amplified output to receiver tube circuit means, brightness control means to control the brightness, contrast control means to control the contrast, tne voltage generating means to generate a voltage, which changes in the same direction as the direction of change of the brightness or contrast when such brightness or contrast change is brought about through adjustment of said brightness or contrast control means, and a band-pass amplifier circuit including a color sub-carrier signal amplifying element to amplify the color sub-carrier signal for supplying the amplified output to color signal detection means, said color sub-carrier signal amplifying element being constituted by a first gate, a source and a drain of a multi-gate field-effect transistor, and voltage coupling means to couple the voltage generated by said voltage generating means to a second gate of said multi-gate field-effect transistor for controlling the amplification factor of the amplifying circuit constituted by said multi-gate field-effect transistor.

2. The color television receiver circuit capable of automatic saturation control according to claim 1, wherein said voltage generating means comprises a cathode resistor for a video amplifier tube.

3. The color television receiver circuit capable of automatic saturation control according to claim 2, wherein the cathode circuit for said video amplifier tube includes a variable resistor for contrast control, the voltage appearing on an end of said variable resistor nearer to the cathode of said video amplifier tube being coupled after removal of *a–c* components to said second gate of said multi-gate field-effect transistor.

4. The color television receiver circuit capable of automatic saturation control according to claim 2, wherein the cathode circuit for said video amplifier tube includes a variable resistor for contrast control, and a capacitor provided between a tap terminal of said variable resistor and ground, the voltage appearing at said tap terminal of said variable resistor being coupled to said second gate of said multi-gate field-effect transistor.

5. The color television receiver circuit capable of automatic saturation control according to claim 1, which includes a bias voltage source for applying a *d–c* bias voltage on said second gate of said multi-gate field-effect transistor.

6. The color television receiver circuit capable of automatic saturation control according to claim 1, wherein said multi-gate field-effect transistor is a dual-gate field-effect transistor.

* * * * *